United States Patent [19]

Lawson

[11] Patent Number: 5,055,545
[45] Date of Patent: Oct. 8, 1991

[54] URETHANE-RUBBER ADHESIVES BASED ON AZOESTER PREPOLYMERS AND DERIVATIVES THEREOF

[75] Inventor: David F. Lawson, Uniontown, Ohio

[73] Assignee: Bridgestone/Firestone, Inc., Akron, Ohio

[21] Appl. No.: 353,831

[22] Filed: May 18, 1989

[51] Int. Cl.$^5$ .............................................. C08G 18/32
[52] U.S. Cl. ....................................... 528/61; 528/64; 428/423.9; 428/424.8; 156/331.7
[58] Field of Search ................... 528/61, 64; 524/190, 524/197, 198; 428/423.9, 424.8; 156/331.7

[56] References Cited

U.S. PATENT DOCUMENTS

| | | | |
|---|---|---|---|
| 3,305,533 | 2/1967 | Thoma et al. | 528/61 |
| 3,483,167 | 12/1969 | Sommer et al. | 528/61 |
| 3,640,937 | 2/1972 | Thoma et al. | 528/61 |
| 3,966,530 | 6/1976 | Cutts et al. | 528/66 |
| 4,061,845 | 12/1977 | Fabris et al. | 528/75 |
| 4,286,014 | 8/1981 | Tanaka et al. | 528/61 |
| 4,369,301 | 1/1983 | Konig et al. | 528/61 |
| 4,446,293 | 5/1984 | Konig et al. | 528/64 |
| 4,598,121 | 7/1986 | Disteldorf | 528/61 |

OTHER PUBLICATIONS

"Recent Advances in the Chemical Modification of Unsaturated Polymers", in *Rubber Chemistry and Technology* (Rubber Reviews), vol. 55, No. 3, pp. 809–859, 1982.

"Triazolinedione Modified Polydienes", in *Ind. Eng. Chem. Prod. Res. Dev.*, vol. 19, pp. 512–526, 1980.

"Pressure-Sensitive Adhesion of Isopropyl-Azodicarboxylate-Modified Polybutadiene to Glass", in *Rubber Chemistry and Technology*, vol. 60, pp. 319–336, 1987.

"Tack and Related Properties of Azoester-Modified Polybutadiene", in *Chem. Abs.*, 99:123876s, 1983.

"Tack and Related Properties of Isopropyl Azodicarboxylate Modified Polybutadiene", in *Chem. Abs.*, 101:74066b, 1984.

"Evidence of Strain-Induced Phase Separation in Isopropyl Azodicarboxylate Modified Polybutadiene", in *Chem. Abs.*, 99:6709d, 1983.

Primary Examiner—John Kight, III
Assistant Examiner—Dennis R. Daley
Attorney, Agent, or Firm—Daniel N. Hall

[57] ABSTRACT

A composite comprises a coating which is adhered to an unsaturated usually cured elastomer utilizing a rubber-urethane adhesive having azoeneophile functionalities such as a dihydrocarbylazodicarboxylate, a dihydrocarbylazodicarboxamide, a dihydrocarbylazoesteramide, or the oxidized reaction product of a urethane prepolymer and a carbazate. A particularly useful carrier for the azoeneophiles is an isocyanate-terminated polyol prepolymer. The composite is useful when a paint is applied to consumer goods, e.g., as a flexible polyurethane paint applied to the sidewalls of tires, as a decorated article, as an adhesively bonded elastomeric composite, and the like.

18 Claims, No Drawings

URETHANE-RUBBER ADHESIVES BASED ON AZOESTER PREPOLYMERS AND DERIVATIVES THEREOF

FIELD OF THE INVENTION

The present invention relates to a urethane-rubber adhesive based on compounds having azoeneophile characteristics.

BACKGROUND

Heretofore, it was generally known to react unsaturated polymers with cyclic azoeneophiles. Elastomer surfaces have been surface treated with four-substituted-1,2,4-triazoline-3,5-dione to improve adhesion to metals or rubbers utilizing conventional elastomer adhesives. However, it has not been known to adhere a polymer coating to an elastomer utilizing an azoester prepolymer or derivatives thereof as the adhesive.

U. S. Pat. No. 3,966,530 to Cutts et al relates to a process of surface treating elastomer surfaces to aid subsequent bonding with metals, paints, and the like.

An article entitled "Recent Advances in the Chemical Modification of Unsaturated Polymers" in *Rubber Chemistry and Technology* (Rubber Reviews), Vol. 55, No. 3, pp 809–859, 1982, relates to ene and other cyclo addition reactions.

An article entitled "Triazolinedione Modified Polydienes" in *Ind. Eng. Chem. Prod. Res. Dev.*, Vol. 19, pages 512–526, 1980, relates to reaction of triazoline dione modifiers with diene polymers.

An article entitled "Pressure-Sensitive Adhesion of Isopropyl-Azodicarboxylate-Modified Polybutadiene To Glass" in *Rubber Chemistry and Technology*, Vol. 60, pages 319–336, 1987, relates to mylar-glass adhesive utilizing bulk polybutadiene modified by isopropyl-azodicarboxylate and pressure.

An Abstract entitled "Tack and Related Properties of Azoester-Modified Polybutadiene" in *Chem. Abs.*, 99:123876s, 1983, relates to modification of polybutadiene by acyclic alkyl azodicarboxylate and related properties.

An Abstract entitled "Tack and Related Properties of Isopropyl Azodicarboxylate Modified Polybutadiene" in *Chem. Abs.*, 101:74066b, 1984, relates to modification of polybutadiene by isopropyl-azodicarboxylate and related properties.

An Abstract entitled "Evidence of Strain-Induced Phase Separation in Isopropyl Azodicarboxylate Modified Polybutadiene" in Chem. Abs., 99:6709d, 1983, relates to stretching isopropyl-azodicarboxylate modified polybutadiene and related properties.

SUMMARY OF THE INVENTION

It has been found that a coating, i.e., an uncured polyurethane paint, can be adhered to a cleaned unsaturated elastomer by utilizing an azoeneophile compound. The elastomer can be natural rubber, synthetic rubber, or blends thereof. The azoeneophile can be applied either neat or dispersed in a solvent, and/or carrier. Various solvents including chlorinated hydrocarbons can be utilized. The azoeneophile can be the oxidized reaction product of a urethane prepolymer and a carbazate, a hydrocarbylazodicarboxylate, a dihydrocarbylazocarboxamide, and a dihydrocarbylazoesteramide. The elastomer surface is generally heated to a temperature of from room temperature to about 125° C. for about 30 seconds to about 30 minutes and the coating is applied and cured if appropriate. The resulting composite exhibits a stronger adhesive bond of the coating to the elastomer than can be achieved without the use of the azoeneophile adhesive.

DETAILED DESCRIPTION OF THE INVENTION

The unsaturated elastomer base or substrate or layer of the present invention to which is bonded or adhered a coating can be any conventional unsaturated rubber compound known to those skilled in the art. That is, the amount of unsaturation is generally high and generally contains more than 10 mol percent, desirably at least 20 mol percent, and preferably more than 40 mol percent of carbon-carbon double and/or carbon-carbon triple bonds (ethylenic and/or acetylenic unsaturation). The substrate can be made from various elastomeric homopolymers, copolymers, terpolymers and the like and blends thereof. One such group is the conjugated dienes having from 4 to 12 carbon atoms. Specific examples of diene monomers include butadiene, isoprene, pentadiene, hexadiene, heptadiene, octadiene, 2,3-dimethyl-1,3-butadiene, 2-methyl-1,3-pentadiene, and the like. Preferred conjugated elastomers are made from monomers of butadiene and/or isoprene. Moreover, natural rubber may be utilized. By the term "natural rubber," it is meant the elastomeric substance obtained from various trees and plants which generally grow in the tropics or desert portions of the world. Such material contains a very high content (in excess of 90 percent and often in excess of 95 percent) of cis-1,4-polyisoprene. Also included within the group of conjugated dienes and/or natural rubber are the various copolymers and interpolymers thereof (e.g., polybutadiene-isoprene), etc.

Another group of elastomers include the various copolymers made from monomers of conjugated dienes having from 4 to 12 carbon atoms as set forth above and vinyl substituted aromatic compounds containing from 8 to 15 carbon atoms. Examples of specific vinyl substituted aromatic compounds include styrene, alpha-methylstyrene, 4-t-butylstyrene, vinyl toluene, divinyl benzene, isopropenyl benzene, diisopropenyl benzene, and the like. Examples of specific copolymers thus include polystyrenebutadiene (SBR), poly-alpha-methylstyrene-butadiene, and poly-4-t-butylstyrene-butadiene. A preferred copolymer is poly(styrene-co-butadiene). Also copolymers include the various copolymers of styrene and butadiene including diblock copolymers, triblock copolymers (e.g., poly(styrene-butadiene-styrene), and the like.

Neoprene, that is polychloroprene (2-chloro-1,3-butadiene), may also be utilized. Still another group of an elastomer rubber is the nitrile rubbers, that is copolymers made from dienes as set forth above having from 4 to 12 carbon atoms with acrylonitrile monomers Usually, the ratio of the two monomers in nitrile rubber is somewhat similar to the ratio of butadiene to styrene in styrene-butadiene rubber. Butyl rubbers, IIR, a copolymer of isobutylene and isoprene, or chlorobutyl rubber, CIIR, or bromobutyl rubber, BIIR, the halogenated counterpart of IIR, can be used, particularly if blended with NR, BR, SBR, etc. Blends of several polymers are particularly useful, e.g., a blend of natural rubber, CIIR, EPDM and polybutadiene The various elastomers can be compounded in accordance with conventional practices using conventional additives and amounts known to those skilled in the art and in the literature including fillers such as carbon black, silica, and various clays, various antioxidants, various curing agents such as sulfur peroxides, various accelerators, various oils, various pigments, various waxes and the like. The preparation of the various elastomers is well known to the art and are generally readily available in commerce Such elastomers generally exist as cured articles, e.g, tires, hoses, etc. Regardless of the type or nature of article in which the elastomer may exist, it is often desirable to clean the surface as by buffing and/or treatment with any conventional organic solvent prior to treating with the adhesive The present invention relates to an adhesive which enhances the bondability between an unsaturated elastomer substrate and a coating The adhesive contains an azo-functional group which is believed to react with the unsaturated elastomer in the following manner.

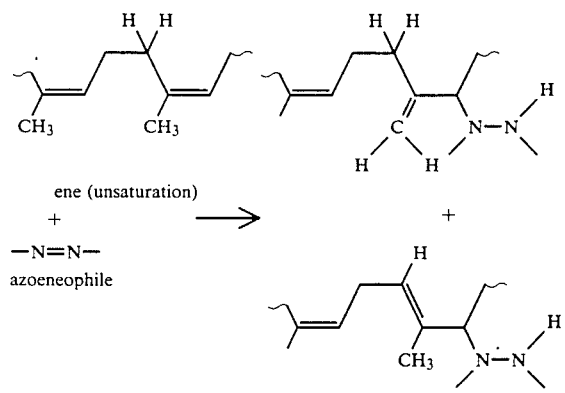

The azo group of the azoeneophile reacts with the unsaturated polymer at the double bond and the adjacent allylic hydrogen atom attaching a polar functional group and causing the double bond to shift positions. Thus, the surface of the unsaturated elastomer is modified when treated with the reactive azoeneophile. It is this added polar functionality which is thought to improve the bonding between the elastomer substrate and the coating by compatibilizing the two materials particularly when the coating is polyurethane.

The azoeneophile can include dihydrocarbylazodicarboxylates, symmetrical or unsymmetrical dihydrocarbylazodicarboxamides, dihydrocarbylazoester-amides, and preferably the oxidized reaction product of a urethane prepolymer and a carbazate. Generally, the urethane prepolymer can be prepared from polyester hydroxyl-terminated, polyether hydroxyl-terminated, and the like, and diisocyanates or triisocyanates.

Considering the oxidized reaction product, it should be apparent to one skilled in the art that numerous urethane prepolymers may be prepared according to conventional methods. For example, the intermediate can be prepared from polyesters having from 2 to 6 carbon atoms, preferably having from 5 to 6 carbon atoms, such as polycaprolactone, or from polyethers having from 2 to 5 carbon atoms, preferably having from 2 to 4 carbon atoms. Specific examples of various compounds containing hydroxyl end groups include copolymers of tetrahydrofuran and ethylene oxide, propylene oxide or butane oxide; polyethylene ether diol, polytrimethylene ether diol, polyhexamethylene ether diol, polypropylene ether diol, polytetramethylene ether glycol (polytetrahydrofuran, PTHF), polyethylene adipate, polyethylenepropylene adipate, polypropylene adipate, polybutadiene diol and polycaprolactone. Preferred hydroxyl terminated compounds include polytetrahydrofurans.

The diisocyanates and triisocyanates which are reacted with the hydroxyl terminated compounds to form the urethane prepolymer can be represented by the formula R(N=C=O)n wherein n is 2 or 3, where R can be an aliphatic containing from 2 to about 20 carbon atoms, a cycloaliphatic containing from 4 to about 20 carbon atoms, or an aromatic or an aliphatic substituted aromatic containing from 6 to about 20 carbon atoms, and mixtures thereof Examples of diisocyanates include the various isomers of diphenyl diisocyanate, the various isomers (i.e., meta-, ortho-, para-) of phenylene diisocyanate, bitolylene diisocyanate, dianisidine diisocyacyanate, isophorone diisocyanate, 4,4.4'-triphenylmethane triisocyanate, hexamethylene diisocyanate, and pentamethylene diisocyanate. Toluene diisocyanate (TDI), methylene bis(4-phenyl isocyanate) (MDI), and methylene 4,4'-di(cyclohexane isocyanate) (HMDI, H$_{12}$MDI) are preferred.

Generally, the amount of the diisocyanates utilized can be 2 moles to 1 mole of the polyester or polyether intermediate. The formation of urethane prepolymers is carried out at temperatures and pressures or other conditions well known to those skilled in the art. The molecular weight of the urethane prepolymer generally ranges from about 600 to 800 to about 30,000 with a preferred molecular weight range being from about 1,000 to about 5,000. Hence, the number of repeat units of the intermediate is generally from about 8 to about 230.

Although the above-described urethane prepolymers may be made in situ, generally such urethane prepolymers are readily available on a commercial basis from numerous manufacturers as well known to those skilled in the art.

The azoestereneophile adhesive is synthesized by the oxidation of the reaction product of the abovenoted urethane prepolymer having isocyanate terminal end groups and a carbazate having the formula

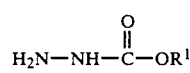

Formula 1 wherein R$^1$ is an alkyl, a cycloalkyl, an aryl, an arylalkyl, or an alkylaryl group having from about 1 to about 20 carbon atoms, desirably 1 to 5 carbon atoms, and preferably is low molecular weight, preferably an ethyl group. It is believed that the reaction between the urethane prepolymer and the carbazate yields a hydrazine-ester compound The hydrazine ester compound is subsequently oxidized to an azoestereneophile prepolymer or to an alkyl azoester.

The oxidizing agent can be the various nitrogen oxides including nitrogen dioxide, dinitrogen tetroxide, nitrogen trioxide, dinitrogen pentaoxide, amine nitrates, and the like, with nitrogen dioxide or dinitrogen tetroxide being preferred. When a nitrogen oxide is utilized as the oxidant, an N'nitroso group may be attached to a carboxamide or azocarboxamide nitrogen Other useful oxidizing agents include lead tetraacetate, cupric chloride, t-butyl hypochlorite, N-haloamides, etc.

Another embodiment of the azoeneophile which can be utilized as the adhesive is a dihydrocarbylazodicarboxylate having the formula

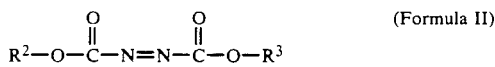

(Formula II)

wherein $R^2$ and $R^3$, independently, is an alkyl, a cycloalkyl, an aromatic or an alkyl or cycloalkyl-substituted aromatic having from 1 to 20 carbon atoms, and preferably is isopropyl. Specific examples include dimethyl azodicarboxylate, diethyl azodicarboxylate, di-n-propyl azodicarboxylate, diisopropyl azodicarboxylate, dibutyl azodicarboxylate, dihexyl azodicarboxylate, diisoamyl azodicarboxylate, dioctyl azodicarboxylate, didecyl azodicarboxylate, dicyclohexyl azodicarboxylate, methyl ethyl azodicarboxylate, methyl isoamyl azodicarboxylate, ethyl isopropyl azodicarboxylate, dicyclohexyl azodicarboxylate, diphenyl azodicarboxylate, and tolyl ethyl azodicarboxylate.

Another embodiment of an azoeneophile which can be utilized as the adhesive is a symmetrical or unsymmetrical dihydrocarbylazodicarboxamide having the formula

(Formula III)

wherein $R^4$ and $R^5$, independently, is an alkyl, a cycloalkyl, an aromatic, or an alkyl or cycloalkyl substituted aromatic having from 1 to 20 carbon atoms and preferably from about 1 to about 10 carbon atoms, wherein x is 1 or 2, wherein y is 0 or 1, wherein v is 1 or 2, and wherein z is 0 or 1. Specific examples include diisopropylazodicarboxamide, diethyl azodicarboxamide, dibutyl azodicarboxamide, diisoamyl azodicarboxamide, dioctyl azodicarboxamide, didecyl azodicarboxamide, bis(2-ethylhexyl) azodicarboxamide, methyl isopropyl azodicarboxamide, hexyl, 2-butyl-azodicarboxamide, diphenyl azodicarboxamide, bis(tolyl) azodicarboxamide, phenyl, isopropyl azodicarboxamide, and bis(piperidino) azodicarboxamide, (also known as 1,1'-(azodicarbonyl)-dipiperidine).

Another embodiment of an azoeneophile which can be utilized as the adhesive is a dihydrocarbylazoesteramide having the formula

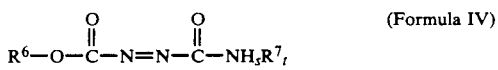

(Formula IV)

wherein $R^6$ and $R^7$, independently, is an alkyl, an aromatic, or an alkyl substituted aromatic group having from 1 to 20 carbon atoms and preferably from about 1 to about 10 carbon atoms, wherein s is 0 or 1, and wherein t is 1 or 2. Specific examples include the cases where $R^6$ is ethyl and $R^7$ is tolyl or tolylene; where $R^6$ is phenyl and $R^7$ is cyclohexyl; where $R^6$ is ethyl, S=0, t=2, and $R^7$ represents a $-(CH_2)_x-$ ring, in which x=4 to 6, and both ends of $-(CH_2)_x-$ are bonded to the amide nitrogen, as in the amide derived from piperidine, x=5. When $R^7$ is very large as when it is a prepolymer as described hereinabove, the above-noted reaction product is also covered by Formula IV. Mixtures of all of the above described azoeneophiles can also be utilized as an adhesive.

The cleaned elastomer surface is surface treated with the azoeneophile which can be applied in a solvent and/or carrier but may also be applied directly to the elastomer surface The azoeneophile can be dispersed in aromatic solvents, such as benzene, toluene, ortho-, meta-, and para-xylenes but only when all the nitrogen oxide oxidizing agent has been removed, in aliphatic or cycloaliphatic solvents such as cyclohexane, in ethers such as THF, in esters such as ethyl acetate, various other solvents, and in chlorinated hydrocarbons, preferably 1,1,1-trichloroethane or methylene chloride A preferred carrier is an isocyanate terminated polyol prepolymer, such as Adiprene L-100, or LW-520, or combinations thereof inasmuch as they improve spreading of the primer material The isocyanate-terminated polyol prepolymer further enhances the compatibility of a polyurethane paint with the elastomer. The use of a carrier allows the azoeneophile to be distributed more uniformly over the elastomer substrate surface The concentration of the azoeneophile in the solvent and/or carrier is from about 1 to about 90 percent by volume to and preferably from about 4 percent to about 50 percent volume, based upon the total volume of said azoeneophile and said carrier.

Generally the azoeneophile can be applied to the elastomer surface by brushing, dipping, spraying, rolling, wiping, rubbing, or the like The solvent is then allowed to evaporate. The treated elastomer surface is then heated to a temperature of from about room temperature to about 125° C., preferably from about 50° C. to about 90° C. for about 30 seconds to about 30 minutes. The surface can be cooled and optionally wiped or rinsed with acetone or other solvent to remove any unreacted azoeneophile.

The coating is then applied to the azoeneophile treated elastomer substrate. Coatings adhered to the elastomer include conventional coatings known to the art and to the literature such as various epoxides, various polyurethanes, various acrylates, various elastomers and the like. Such coatings are generally decorative in nature and thus often can be paints containing pigments therein. The epoxy coating can be any conventional epoxy such as a difunctional epoxy resin and the like, and are characterized by containing the epoxy or oxirane group therein. The urethanes can be made in any conventional manner and thus can be made from an ether intermediate such as an oxyethylene or an oxypropylene, a butylene oxide (THF), or a lactone intermediate such as caprolactone or a polyester. Examples of other suitable urethanes in the form of a paint are essentially the same as set forth in U.S. Pat. No. 4,259,227 to Ojakaar, in U.S. Pat. No. 4,131,149 to Roberts, and in U.S. Pat. No. 4,177,233 to Roberts, all of which are hereby fully incorporated by reference. Similarly, the acrylates can be in the form of a soft acrylate polymer or copolymer thereof. Generally the coatings are cured according to procedures well known to those of ordinary skill in the art.

The present invention can be utilized in any application wherein it is desirable to bond or adhere a coating to an unsaturated elastomer. A composite of the elastomer, the azoeneophile adhesive and the coating is thus formed. In the manufacture of automobile tires and industrial rubber products, it is frequently desirable to apply a polyurethane paint for decoration and/or identification marking. An advantage of the azoester prepolymer is that a very strong bond is formed between the polyurethane coating and the unsaturated elastomer.

The invention will be better understood by reference to the following example

EXAMPLE 1

Preparation of Azoester Prepolymer and Application to Rubber Surface

Ethyl carbazate (22.3 g, 0.212 mol) was added to a 1 liter flask containing 30 ml of distilled toluene and 100 ml of reagent tetrahydrofuran (THF). The contents were kept under a N2 atmosphere while a solution of an isocyanate-terminated polyTHF diol in distilled toluene (100 g, 0.106 equiv. of $H_{12}$MDI/PTHF, Du Pont LW 520, in 100 ml toluene) was added dropwise The mixture was stirred at room temperature for one day, then precipitated in hexane. The viscous lower phase was separated and heated at 60° C., 1 mm Hg, for 3 hours. The collected hazy product weighed 75.2 g, and contained some whitish specs.

A 5 g portion of the above fluid was dissolved in 150 ml of methylene chloride and placed in a 500 ml flask with 20 g $MgSO_4$ and 15 g $K_2CO_3$. While the mixture was cooled in an ice bath, $N_2O_4$ was bubbled through, and the flask was closed to the atmosphere. After stirring for 2 hours at 5–10° C., the contents of the flask were filtered and the solvent was evaporated. The product was a viscous yellow oil, weighing 4.6 g, which was diluted ca. 1:1 with methylene chloride and stored in the freezer in a brown glass bottle.

This solution was applied to a rubber pad by swabbing, and the pad was then heated at 60° C. for 20 min. The surface was still tacky, and the prepolymer film could be completely removed by swabbing with an acetate-soaked towel, leaving a surface which appeared the same as before treatment.

A second pad coated with the azoester prepolymer solution, then heated 30 min. at 60° C., followed by 5 min. at 130° C., had an etched appearance on the surface after swabbing with acetate as above.

A third pad was coated as above with the azoester prepolymer solution, heated 20 min. at 60° C., 20 min. at 130° C., then swabbed with acetone, to give an etched appearance. The acetone was allowed to evaporate briefly at room temperature, then completely evaporated by heating at 100° C. for 10 min. This sample was coated with a flexible urethane paint to a thickness of about 0.010 inch, and the coating was cured at 105° C. for 50 min. The urethane paint was essentially the same as set forth in U.S. Pat. No. 4,259,227 to Ojakaar. Adhesion properties were evaluated after one week, from both X-peel and flex test measurements.

X-Peel Tests

Adhesion was measured one week after curing the coating on the rubber pad, by scoring the coating in a manner completely cutting the coating, but coming just to the rubber with a razor blade, making an "X" with a 30 degree angle. The 30 degree vertex was scratched with a fingernail to peel back the coating. The ease or difficulty of peeling, and the appearance of the interface, were assessed. The results are summarized as follows:

| Treatment | East of Peeling | Adhesion |
| --- | --- | --- |
| None | Easy to moderate | Fair to poor |
| Oxidized reaction Product. of Ex. 1 | Difficult | Good to excellent |

Flex Testing

Samples were prepared by drawing down the coating to a thickness of about 0.020 inch on an unreinforced rubber plaque of about 0.075 inch thickness. This result was accomplished by plying masking tape around the edges of a 6"x 6" square plaque to the desired coating thickness. A string was laid across the center of the plaque and covered with a ½" wide strip of thin Teflon film before applying the coating. After the sample was cured and allowed to cool, the tape and string were lifted up, exposing a ½" uncoated strip across the center of the plaque. The plaque was cut into ½" wide strips, transverse to the uncoated section. Flex testing was performed at least one week after the coatings were cured. The tests were performed by mounting the strips in dies in a Monsanto Flex tester. Each strip was repeatedly stretched to 133 percent of its original length, and the relative adhesion was estimated from the number of flexes before which a delamination of ¼" was observed.

| Treatment | Flexes to ¼" Delamination |
| --- | --- |
| None | 100–500 |
| Oxidized product of Example 1 | 2600–3000 |

The sample was flexed at 33 percent strain to approximately 2800 cycles on average before a one-quarter inch delamination occurred.

EXAMPLE 2

Adhesive Priming with Diisopropylazodicarboxylate (DIAD), and Application of Polyurethane Coating A fabric-reinforced rubber plaque consisting of a blend of natural rubber, polybutadiene, EPDM and chlorobutyl rubber was cleaned by rubbing the surface with acetone as described above. This was brushed with four coats of a 4 percent solution (w/v) of DIAD in 1,1,1-trichloroethane. After allowing it to dry at room temperature, the pad was heated to 60° C. for 20 minutes, then was allowed to cool and rubbed with acetone to remove unreacted DIAD. The pad was again allowed to dry in air, and was coated by drawing down a 0.01 inch layer of the white polyurethane coating (above) on the surface. The sample was cured at 100° C. for 1 hour, resulting in a white, tightly-bonded surface coating. The spreading of the coating was fair to good, while the X-peel adhesion, determined as in Example 1, was good to excellent (i.e., the coating could be peeled back only with great difficulty, with rubber tearing noted, indicating that the peel strength was comparable to the tear strength of the rubber). A rubber sample without the adhesive primer treatment showed the same results as the untreated sample of Example 1.

The uniformity of spreading of the coating was improved if the azoeneophile (e.g. DIAD) was applied in the form of a dispersion in a low molecular weight polymer carrier. For example, a solution of 2 percent (w/v) of DIAD and 5 percent (w/v) of isocyanate-terminated low molecular weight polytetrahydrofuran (Du Pont LW-520) in toluene was brushed on the surfaces of two rubber pads and allowed to evaporate, then the pads were heated 20 min. at 60° C. and 10 min. at 125° C. Upon cooling the treated surfaces were slightly tacky. One of the pads was spread with the white polyurethane coating (see above), with a uniform, complete wet-out of the surface by the coating taking place. The treated surface of the second pad was brought into contact with the freshly spread coating, and the two pads were pressed together firmly, forming a rubber-urethane-rubber laminate. A light pressure was applied while the laminate was cured for 80 min. at 90° C. Upon cooling to room temperature and storage for one week, one-inch wide strips of the adhesively bonded composite could be separated by peeling only with difficulty, requiring approximately 10-35 pounds per linear inch of force. Furthermore, the separation was accompanied by a combination of interfacial delamination and jagged tearing of the rubber. Identical laminates with untreated rubber surfaces were separable with less effort, and they underwent clean, interfacial separations between the rubber and the urethane.

Test Rubber Stock

The rubber composition used in these laboratory tests was a vulcanized blend of roughly equal proportions of natural, chlorobutyl, EPDM and polybutadiene rubbers, compounded with standard carbon black filler, curatives and processing aids. The invention should be useful with most rubbers, provided there is sufficient unsaturation present for reaction with the azoeneophile.

While in accordance with the Patent Statutes, the best mode and preferred embodiment has been set forth, the scope of the invention is not limited thereto, but rather by the scope of the attached claims.

What is claimed is:

1. A urethane to rubber adhesive, comprising:
an azoeneophile, said azoeneophile being
the oxidized reaction product of
   (a) an isocyante terminated prepolymer made from a hydroxyl terminated polyether intermediate or a polyester intermediate and a polyisocyante having the formula $R(N=C=O)_n$ wherein n is 2 or 3 and wherein R is an aliphatic, a cycloaliphatic, an aromatic, or an aliphatic substituted aromatic having a total of from 2 to 20 carbon atoms, and
   (b) a carbazate having the formula

(Formula I)

wherein $R^1$ is an alkyl, a cycloalkyl, an aromatic, or an alkyl substituted aromatic having 1 to 20 carbon atoms which is an azoestereneophile prepolymer or an alkyl azoester.

2. A urethane to rubber adhesive according to claim 1, wherein the repeat unit of said polyester intermediate contains from about 2 to about 6 carbon atoms, and wherein the repeat unit of said polyether intermediate contains from about 2 to about 5 carbon atoms.

3. A urethane to rubber adhesive according to claim 2, wherein the repeat unit of said polyester intermediate contains from about 2 to about 4 carbon atoms, and wherein the repeat unit of said polyether intermediate contains from about 5 to about 6 carbon atoms.

4. A urethane to rubber adhesive according to claim 3, wherein said urethane prepolymer has a molecular weight of from about 600 to about 30,000.

5. A urethane to rubber adhesive according to claim 4, wherein said urethane prepolymer has a molecular weight of from about 1,000 to about 5,000.

6. A urethane to rubber adhesive according to claim 5, wherein said (a) hydroxyl terminated polyether intermediate is polytetrahydrofuran, and wherein said polyisocyanate is toluene diisocyanate, methylene bis(4-phenyl isocyanate), and methylene 4,4'-di(cyclohexane isocyanate), or combinations thereof, and wherein said (b) carbazate is ethyl carbazate.

7. A urethane to rubber adhesive according to claim 3, wherein said azoeneophile is applied to a rubber substrate at a temperature of from about ambient to about 125° C.

8. A urethane to rubber adhesive according to claim 5, wherein said azoeneophile is said reaction product, wherein said reaction product is directly applied to a rubber substrate, and wherein said rubber substrate is at least 10 mol percent unsaturated.

9. A urethane to rubber adhesive according to claim 1, wherein said azoeneophile is applied to a rubber substrate, wherein a coating is applied to said adhesive-treated rubber substrate, and wherein said coating is a polyurethane, an epoxy, an acrylic, or an acrylate, and wherein said rubber substrate is at least 40 mol percent unsaturated.

10. A urethane to rubber adhesive according to claim 3, wherein said azoeneophile is applied to a rubber substrate, wherein a coating is applied to said adhesive-treated rubber substrate, and wherein said coating is a polyurethane, an epoxy, an acrylic, or an acrylate, and wherein said rubber substrate is at least 40 mol percent unsaturated.

11. A urethane to rubber adhesive according to claim 6, wherein said azoeneophile is said reaction product, wherein said reaction product is applied to a rubber substrate, including a coating, said coating applied to said adhesive-treated rubber substrate, and wherein said coating is a polyurethane, an epoxy, an acrylic, or an acrylate, and wherein said rubber substrate is at least 40 mol percent unsaturated.

12. A cured elastomeric article having an adhesive coating thereon comprising the adhesive of claim 1.

13. A cured elastomeric article having an adhesive coating thereon comprising the adhesive of claim 3.

14. A cured elastomeric article having an adhesive coating thereon comprising the adhesive of claim 6.

15. A cured elastomeric article having an adhesive coating thereon comprising the adhesive of claim 8.

16. A cured elastomeric article having an adhesive coating thereon comprising the adhesive of claim 9.

17. A cured elastomeric article having an adhesive coating thereon comprising the adhesive of claim 10.

18. A cured elastomeric article having an adhesive coating thereon comprising the adhesive of claim 11.

* * * * *